(12) United States Patent
Hoshi et al.

(10) Patent No.: US 9,156,378 B2
(45) Date of Patent: Oct. 13, 2015

(54) VEHICLE SEAT (75) Inventors: Masayuki Hoshi, Tochigi-ken (JP);
Yuusuke Satou, Inuyama (JP);
Mitsunobu Nishioka, Inuyama (JP);
Takuto Esaki, Inuyama (JP)

(73) Assignees: TS Tech Co., Ltd., Saitama (JP);
Imasen Electric Industrial Co., Ltd., Aichi (JP)

( * ) Notice: Subject to any disclaimer, the term of this patent is extended or adjusted under 35 U.S.C. 154(b) by 145 days.

(21) Appl. No.: 13/879,518

(22) PCT Filed: Oct. 15, 2010

(86) PCT No.: PCT/JP2010/068145
§ 371 (c)(1),
(2), (4) Date: Apr. 15, 2013

(87) PCT Pub. No.: WO2012/049766
PCT Pub. Date: Apr. 19, 2012

(65) Prior Publication Data
US 2013/0214580 A1    Aug. 22, 2013

(51) Int. Cl.
*B60N 2/235* (2006.01)
*B60N 2/68* (2006.01)
*B60N 2/22* (2006.01)

(52) U.S. Cl.
CPC ............ *B60N 2/2213* (2013.01); *B60N 2/2356* (2013.01); *B60N 2/682* (2013.01)

(58) Field of Classification Search
CPC ..... B60N 2/2356; B60N 2/2213; B60N 2/682
USPC ............................... 297/367 P, 367 L, 354.12
See application file for complete search history.

(56) References Cited

U.S. PATENT DOCUMENTS

| | | | | |
|---|---|---|---|---|
| 7,552,971 | B1 * | 6/2009 | Tarusawa et al. | 297/367 P |
| 7,802,849 | B2 * | 9/2010 | Tarusawa et al. | 297/367 P |
| 7,828,386 | B2 * | 11/2010 | Reubeuze et al. | 297/367 P |
| 7,950,741 | B2 * | 5/2011 | Mitsuhashi | 297/362 |
| 7,967,385 | B2 * | 6/2011 | Cillierre et al. | 297/367 P |
| 7,988,233 | B2 * | 8/2011 | Yamada et al. | 297/367 P |
| 8,256,843 | B2 * | 9/2012 | Iguchi | 297/367 P |
| 8,267,476 | B2 * | 9/2012 | Kumazaki et al. | 297/367 P |
| 8,641,146 | B2 * | 2/2014 | Suzuki et al. | 297/367 R |
| 2005/0035640 | A1 | 2/2005 | Shinozaki | |

(Continued)

FOREIGN PATENT DOCUMENTS

| | | | |
|---|---|---|---|
| JP | 2001-017259 A | 1/2001 | |
| JP | 2004-173922 A | 6/2004 | |

(Continued)

*Primary Examiner* — David R Dunn
*Assistant Examiner* — Timothy J Brindley
(74) *Attorney, Agent, or Firm* — Drinker Biddle & Reath LLP (57) ABSTRACT A recliner mechanism 4 of a seat for a vehicle includes components in a case 15 having one side case 20 and the other side case 25. The case 15 is integrally attached by the attachment member 50 so that the one side case 20 and the other side case 25 are freely rotated. The attachment member 50 has at least a horizontal tubular portion 51 having a predetermined length and an abutment portion 52 connected to a peripheral edge of the tubular portion 51. In the attachment member 50, an abutment portion 52 is provided on either one of left and right sides of the tubular portion 51, and the other side of the tubular portion 51 is formed in an opening 56 for fitting in which the case 15 can be fitted.

8 Claims, 7 Drawing Sheets (56) References Cited

U.S. PATENT DOCUMENTS

| | | | |
|---|---|---|---|
| 2008/0211285 A1* | 9/2008 | Ishihara et al. | 297/366 |
| 2009/0236892 A1* | 9/2009 | Cillierre et al. | 297/366 |
| 2009/0243363 A1* | 10/2009 | Tarusawa et al. | 297/367 P |
| 2009/0250990 A1* | 10/2009 | Endo et al. | 297/367 P |
| 2010/0033004 A1* | 2/2010 | Reubeuze | 297/367 P |
| 2010/0194165 A1* | 8/2010 | Iguchi | 297/367 P |
| 2011/0012414 A1* | 1/2011 | Yamada et al. | 297/367 P |
| 2011/0057493 A1* | 3/2011 | Wahls | 297/367 P |
| 2011/0115271 A1* | 5/2011 | Yamada et al. | 297/367 P |
| 2011/0254338 A1* | 10/2011 | Fisher et al. | 297/367 P |
| 2011/0304189 A1* | 12/2011 | Wahls | 297/367 R |
| 2012/0169105 A1* | 7/2012 | Assmann et al. | 297/367 P |

FOREIGN PATENT DOCUMENTS

| | | |
|---|---|---|
| JP | 2004-358007 A | 12/2004 |
| JP | 2008-018108 A | 1/2008 |

* cited by examiner

VEHICLE SEAT

TECHNICAL FIELD

The present invention relates to a vehicle seat.

BACKGROUND ART

Conventionally, in a recliner mechanism adjusting an inclination angle of a backrest seat, one side case provided with an engagement gear and the other side case provided with a slide groove guiding movement of a sliding rock member engaged with and released from the engagement gear are mounted integrally so that the one side case and the other side case are rotated freely by an attachment member, and this configuration is well-known (Patent Literature 1).

In the above well-known example, a tubular attachment member is attached by a so-called caulking processing, in which the tubular attachment member is covered on the outer circumferences of the one side case and the other side case and pressure is applied from a cross direction to a shaft center direction of the one side case and the other side case to deform the attachment member, so that the one side case and the other side case are freely rotated.

CITATION LIST

Patent Literature

Patent Literature 1: JP 2004-358007 A

SUMMARY OF INVENTION

Technical Problem

In the above well-known example, since the one side case and the other side case are attached by the so-called caulking processing so as to be freely rotated, the work is very troublesome, and there is a problem that the actuation is unstable.

Namely, when the both ends of the tubular attachment member are deformed by receiving pressure to be adhered firmly to side surfaces of the one side case and the other side case, and, thus, to be strongly adhered, rotational resistance between the one side case and the other side case increases. Meanwhile, when the adhesion is weak, the one side case and the other side case rotate while rattling, and this causes actuation failure.

Accordingly, in the well-known example, setting and processing are not easy, and the work is very troublesome, so that actuation is unstable.

In the present application, while a shape of an attachment member is devised to stabilize rotation of one side case and the other side case, and, thus, to enhance actuation accuracy, assembly is facilitated.

Solution to Problem

This invention provides a seat for a vehicle. In this seat for a vehicle, a backrest seat 3 is attached to a seat 2 through a recliner mechanism 4 so that the backrest seat 3 is freely rotated about a rotating central shaft 12 and the inclination angle is freely adjusted, the recliner mechanism 4 has at least a case 15 having one side case 20 and the other side case 25, an engagement gear 22 is provided on an inner circumferential surface of either one of the one side case 20 and the other side case 25, and a slide groove 26 for guiding movement of a slide lock member 24 in which a lock gear portion 23 engaged with and released from the engagement gear 22 is provided on the other one of the one side case 20 and the other side case 25 is provided. The case 15 is integrally attached by an attachment member 50 so that the one side case 20 and the other side case 25 are freely rotated, the attachment member 50 has at least a horizontal tubular portion 51 having a predetermined length and an abutment portion 52 connected to a peripheral edge of the tubular portion 51, in the attachment member 50, the abutment portion 52 is provided on either one of left and right sides of the tubular portion 51, and the other one of left and right sides of the tubular portion 51 is formed into an opening 56 for fitting in which the case 15 can be fitted.

This invention further provides a seat for a vehicle in which an inclined surface or a step portion 58 is provided between the tubular portion 51 and the abutment portion 52, and the outer circumferential surface of the case 15 is abutted against and engaged with the inclined surface or the step portion 58.

This invention furthermore provides a seat for a vehicle which is provided with a fixing portion 57 in which the peripheral edge of the tubular portion 51 on the side of the opening 56 for fitting and a predetermined portion of the case 15 which is not abutted against the abutment portion 52 are fixed.

This invention furthermore provides a seat for a vehicle in which either one of the one side case 20 and the other side case 25 of the case 15 is fixed to the tubular portion 51 of the attachment member 50, the other one of the one side case 20 and the other side case 25 is abutted against the abutment portion 52 to be freely rotated with respect to the attachment member 50, the attachment member 50 and the one side case 20 or the other side case 25 fixed to the attachment member 50 is fixed to either one of a backrest side bracket 10 of the backrest seat 3 and a seat side bracket 11 of the seat 2, the one side case 20 or the other side case 25 which is not fixed to the attachment member 50 is fixed to the other one of the backrest side bracket 10 and the seat side bracket 11.

This invention furthermore provides a seat for a vehicle in which the attachment member 50 is provided integrally with a portion of the backrest side bracket 10 of the backrest seat 3 or the seat side bracket 11 of the seat 2.

This invention furthermore provides a seat for a vehicle in which either one of the one side case 20 and the other side case 25 of the case 15 is fixed to the tubular portion 51 of the attachment member 50, the other one of the one side case 20 and the other side case 25 is abutted against the abutment portion 52 to be freely rotated with respect to the attachment member 50, the attachment member 50 and the one side case 20 and the other side case 25 fixed to the attachment member 50 are fixed to the seat side bracket 11 of the seat 2, the seat side bracket 11 is located outside the backrest side bracket 10 of the backrest seat 3, and the one side case 20 or the other side case 25 which is not fixed to the attachment member 50 is fixed to the backrest side bracket 10 through a connecting window hole 61 formed inside the abutment portion 52.

Advantageous Effects of Invention

In the invention according to claim 1, in the attachment member 50, the abutment portion 52 is provided on one side of the tubular portion 51, and the other side of the tubular portion 51 is formed in the opening 56; therefore, the case 15 is fitted in the attachment member 50 through the opening 56, and one side surface 54 is abutted against the abutment portion 52, whereby the other side surface 55 of the case 15 is easily fixed to a predetermined portion of the tubular portion 51, and assembly operation can be facilitated. Moreover, each rotation of the one side case 20 and the other side case 25 is stabilized, and the actuation accuracy can be enhanced.

In the invention according to claim 2, since the inclined surface or the step portion 58 is provided between the tubular portion 51 and the abutment portion 52, the rigidity of the attachment member 50 is enhanced, and, at the same time, the attachment member 50 and the case 15 are strongly fixed in a shaft center direction and a cross section.

In the invention according to claim 3, since the fixing portion 57 is provided by fixing the peripheral edge of the tubular portion 51 on the side of the opening 56 for fitting and a predetermined portion of the case 15 which is not abutted against the abutment portion 52, a portion of the fixing portion 57 can be separated from the shaft center of the case 15, and the fixing strength can be enhanced.

In the invention according to claim 4, the attachment member 50 can be used as both a connection fixing member for the one side case 20 and the other side case 25 of the case 15 and an attachment member for the backrest side bracket 10 and the seat side bracket 11, so that the number of constituents of the entire recliner mechanism 4 can be reduced, assembling man-hours can be reduced, and weight saving and manufacturing cost reduction can be realized.

In the invention according to claim 5, since the attachment member 50 is provided integrally with a portion of the backrest side bracket 10 or the seat side bracket 11, the number of the constituents of the entire recliner mechanism 4 can be further reduced, the assembling man-hours can be reduced, and weight saving and manufacturing cost reduction can be realized.

In the invention according to claim 6, it is possible to realize with a simple configuration a component used as both the connection fixing member for the one side case 20 and the other side case 25 of the case 15 of the attachment member 50 and the attachment member for the backrest side bracket 10 and the seat side bracket 11. Moreover, since the attachment member 50 having a recess shape is provided integrally with the seat side bracket 11, the case 15 can be provided by utilizing the horizontal thickness of the seat side bracket 11 while the strength of the seat side bracket 11 is enhanced, so that the size of the installation space of the recliner mechanism 4 can be reduced.

DESCRIPTION OF EMBODIMENTS

An example of the invention will be described with reference to the drawings.

Reference numeral 1 is a seat for a vehicle. In the seat 1 for a vehicle, a backrest seat 3 is attached to a seat 2 through a recliner mechanism 4 so that the inclination angle is freely adjusted in the longitudinal direction (for ease of understanding, directions including a longitudinal direction, a horizontal direction, inward and outward directions, and front and back side directions are shown; however, the constitution of this invention is not limited by the directions).

The backrest seat 3 includes a backrest side bracket 10, and a seat side bracket 11 provided on the seat 2 side is attached to the backrest side bracket 10 by a rotating central shaft 12 so as to be freely rotated.

The backrest side bracket 10 is attached to the seat side bracket 11 by the recliner mechanism 4 so that the inclination angle is freely adjusted. Although the recliner mechanism 4 may have any configuration, the recliner mechanism 4 has at least a case 15 having one side case 20 and the other side case 25, and an engagement gear 22 is formed on an inner circumferential surface of either one of the one side case 20 and the other side case 25. The one side case 20 and the other side case 25 include a slide lock member 24 having a lock gear portion 23 engaged with and released from the engagement gear 22. Either one or both of the one side case 20 and the other side case 25 have a slide groove 26 for guiding movement of the slide lock member 24.

Specifically, the engagement gear 22 is provided in the inner circumferential surface of the one side case 20. The lock member 24 slides in the slide groove 26 of the other side case 25 and moves near to and away from the engagement gear 22. The lock member 24 is switched between a lock state in which the lock member 24 is engaged with the engagement gear 22 and an unlock state in which the lock member 24 is released from the engagement gear 22.

Figure 1:
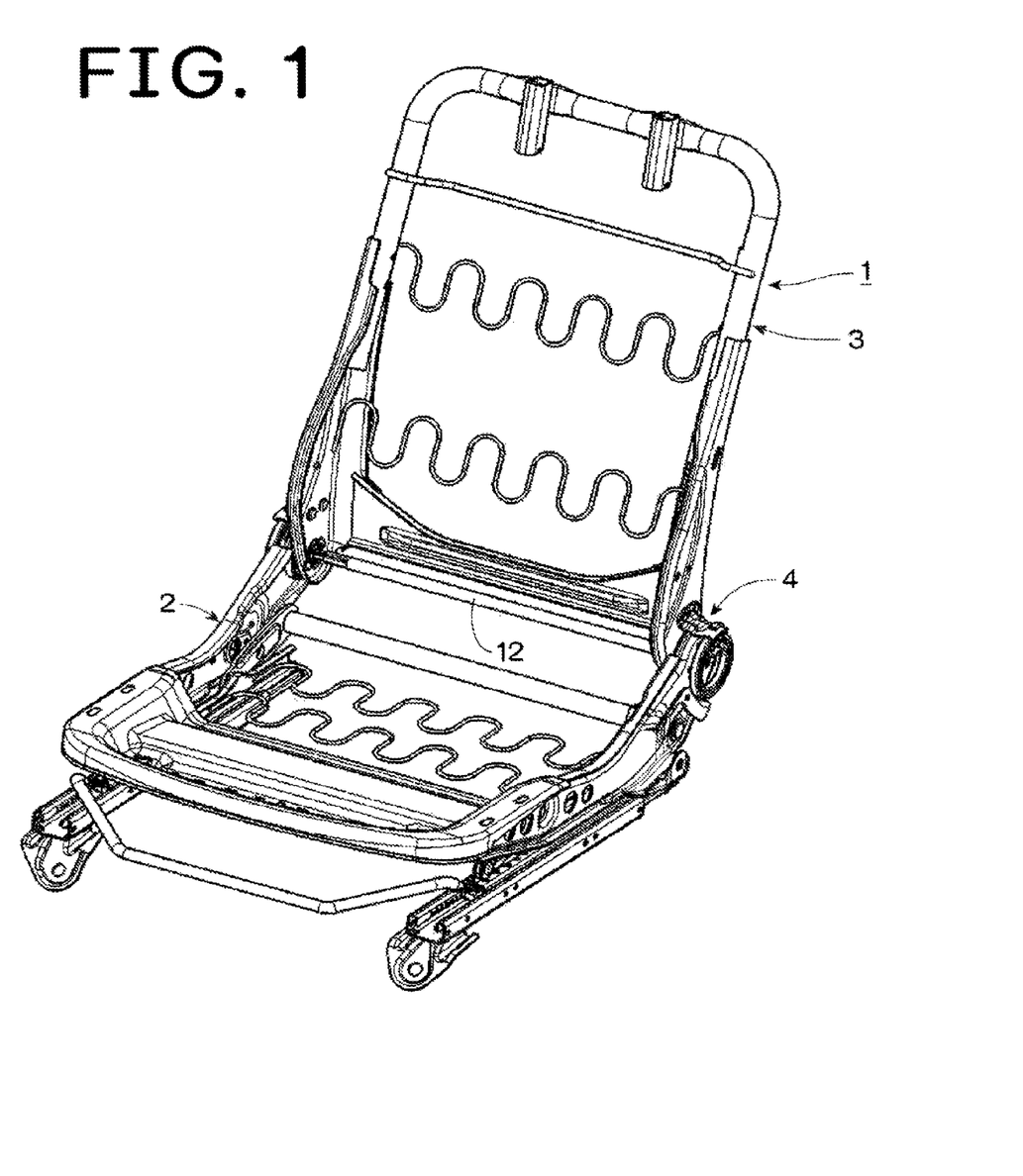
FIG. 1 is a schematic side view of a frame of a seat for a vehicle.
Figure 2:
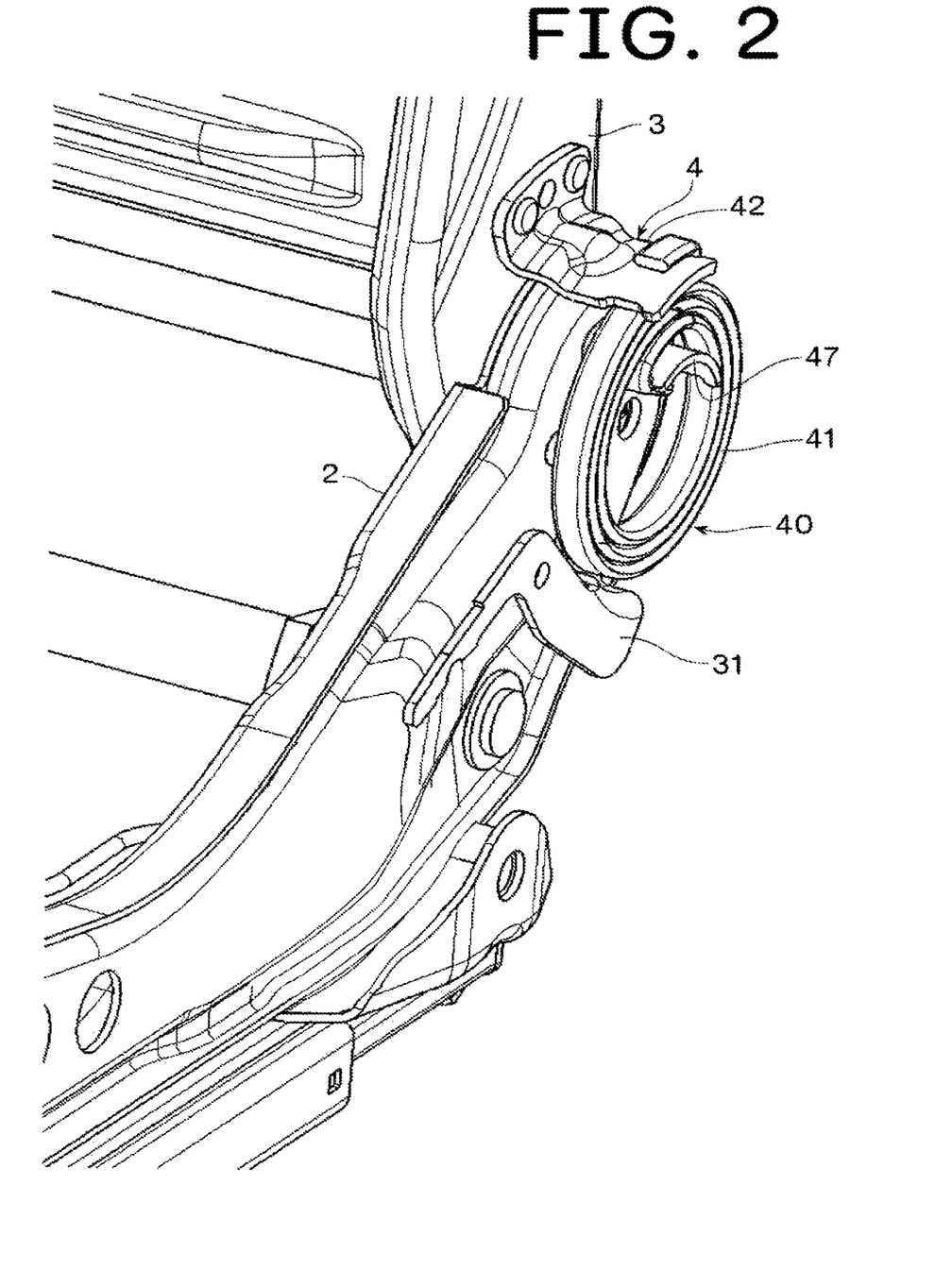
FIG. 2 is a schematic perspective view of an attachment portion of a recliner mechanism.
Figure 3:
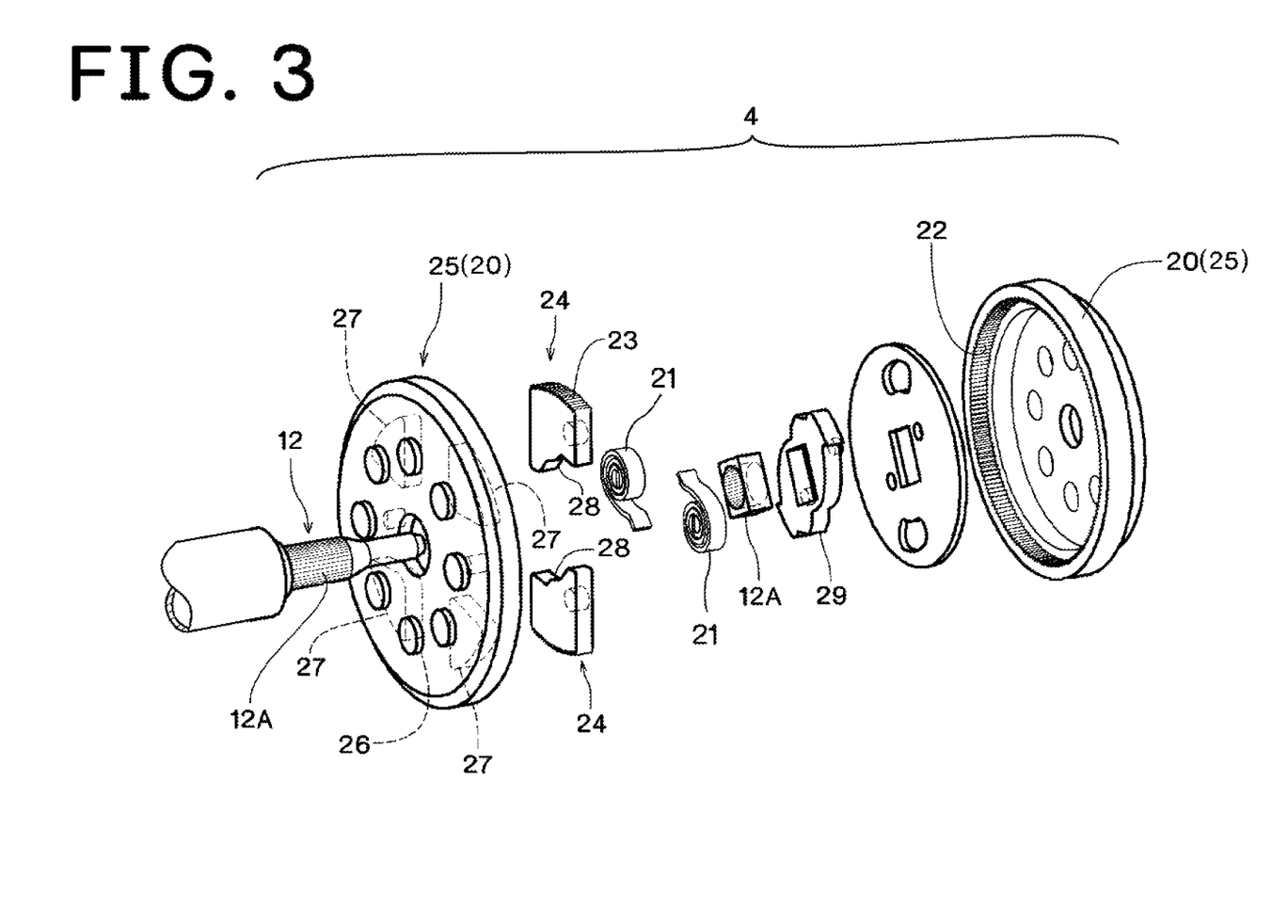
FIG. 3 is an exploded perspective view of the recliner mechanism.
Figure 4:
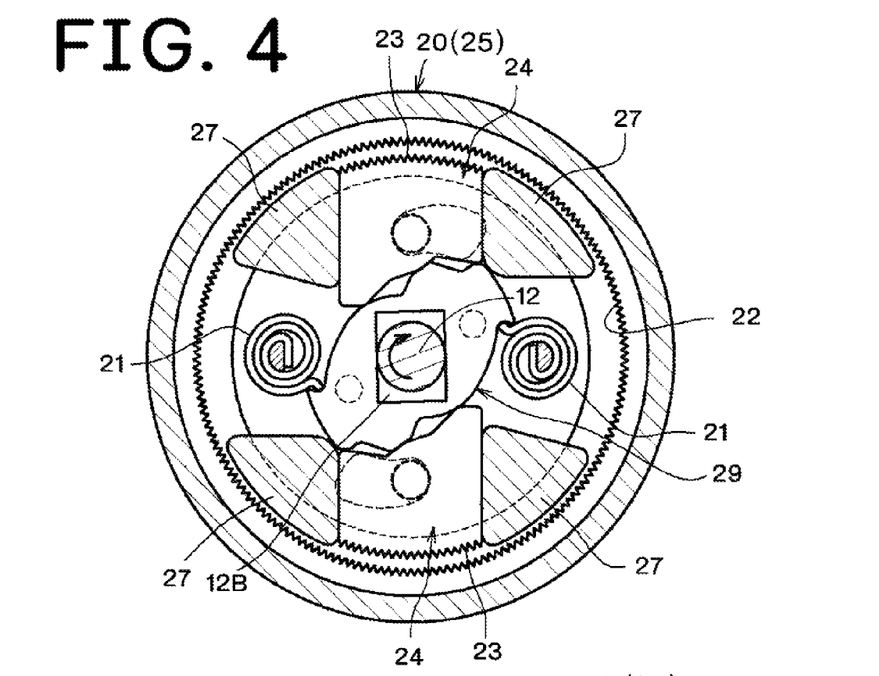
FIG. 4 is a side view of an unlock state of the recliner mechanism.
Figure 5:
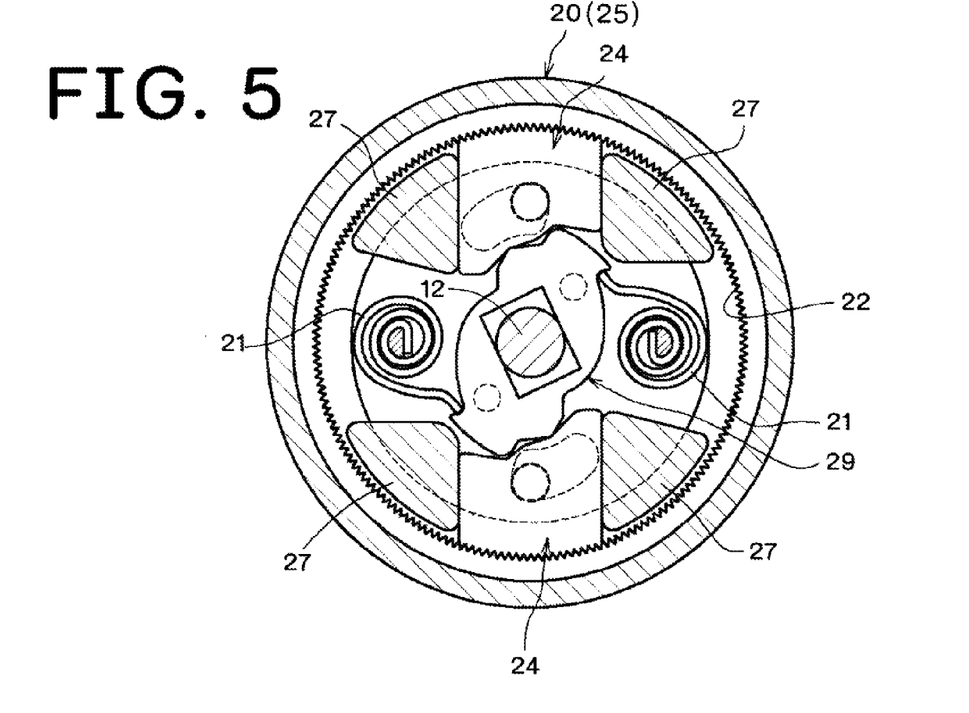
FIG. 5 is a side view of the lock state of the recliner mechanism.
Figure 6:
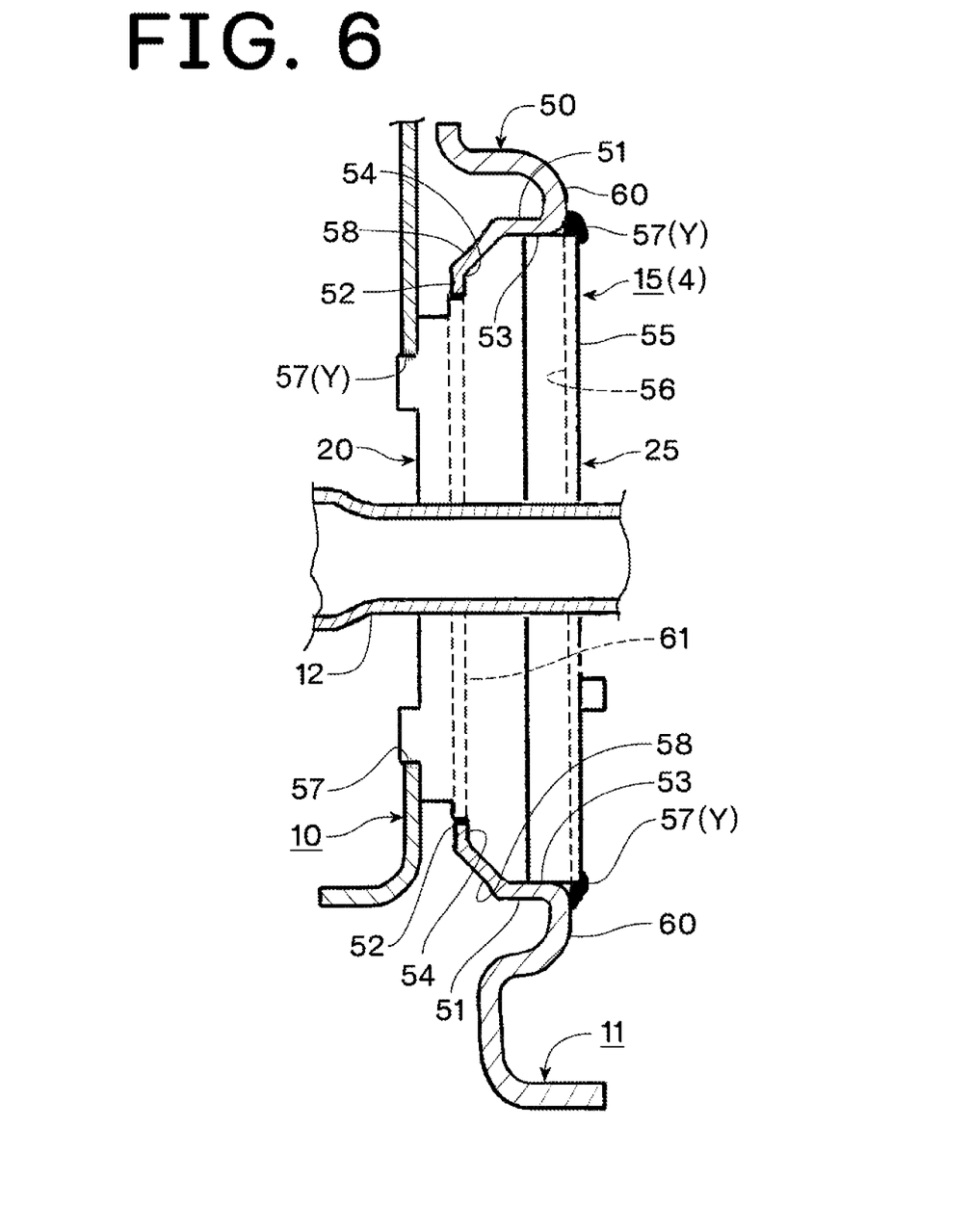
FIG. 6 is a cross-sectional view of a recliner mechanism attached portion.

The other side case 25 has expanding portions 27, 27 expanding inward. The slide groove 26 is provided between the expanding portions 27 provided face to face longitudinally (horizontally in FIG. 4).

A pair of the upper and lower lock members 24 is provided and has a cam surface 28 on the rotating central shaft 12 side of the lock member 24. The both ends of the cam body 29 are abutted against the cam surface 28 of each of the lock members 24. The cam body 29 is attached in a fixing state to the rotating central shaft 12.

Namely, the recliner mechanism 4 may have a constitution in which the lock member 24 is held between the one side case 20 and the other side case 25 and the lock member 24 is engaged with and released from the engagement gear 22 of the inner circumferential surface of either one of the one side case 20 and the other side case 25.

In the recliner mechanism 4, when the rotating central shaft 12 is rotated and operated by an operating lever 31 for reclining, the rotating central shaft 12 rotates the cam body 29, the cam body 29 is abutted against the cam surface 28 of the lock member 24, and the lock member 24 slides in the slide groove 26 between the expanding portions 27, 27 in a direction separating from the engagement gear 22 to unlock the recliner mechanism 4. The inclination angle of the backrest seat 3 is adjusted, and when the operating lever 31 for reclining is released, the cam body 29 is rotated in the lock direction by a spring 21, the lock member 24 slides in the slide groove 26, and the lock gear portion 23 of the lock member 24 is engaged with the engagement gear 22 to lock the recliner mechanism 4.

There may be adopted any configuration of rotating the cam body 29 by the operation of the operating lever 31 for reclining. In this example, the cam body 29 is attached in a fixing state to the rotating central shaft 12, and the rotating central shaft 12 is directly rotated by the operating lever 31 for reclining. However, the rotating central shaft 12, the cam body 29, and the operating lever 31 for reclining may be connected by operation transmitting means such as a link, and the configuration is not limited to the configuration of the present application.

In the above case, as in the example, for example, a groove 12A referred to as so-called serrations is provided in the rotating central shaft 12, and the groove 12A is configured to be rotated integrally with a fitting member 12B fitted in the cam body 29. The operating lever 31 for reclining and the cam body 29 are attached in a fixing state to the rotating central shaft 12, and the cam body 29 is rotated by the operation of the operating lever 31 for reclining.

Any attachment configuration of the rotating central shaft 12 may be adopted, and the rotating central shaft 12 formed into a pin shape may be inserted from outside the seat side bracket 11. However, when the rotating central shaft 12 is provided to be freely rotated while projecting laterally with respect to a side frame 35 of the seat frame 6, the recliner mechanism 4 is easily attached and assembled, and thus it is preferable.

A spring 40 which allows the backrest seat 3 to be inclined forward when the recliner mechanism 4 is unlocked is provided between the backrest side bracket 10 and the seat side bracket 11. The spring 40 is constituted of a so-called spiral spring formed having a spiral portion 41 which is spiraled one or more turns at its center.

One end of the spiral portion 41 is anchored to a seat side retention body 42 of the backrest side bracket 10. The other end of the spiral portion 41 is anchored to a seat side retention body 47 of the seat side bracket 11.

In the recliner mechanism 4, the one side case 20 and the other side case 25 of the case 15 are integrally fixed by an attachment member 50, and the case 15 and the attachment member 50 are attached to the backrest side bracket 10 and the seat side bracket 11.

The attachment member 50 is constituted of a horizontal tubular portion 51 having a predetermined length and a longitudinal abutment portion 52 connected to a peripheral edge of the tubular portion 51. The inner circumferential surface of the tubular portion 51 is formed to face the outer circumferential surface 53 of the case 15.

In such a state that the case 15 is located on the inner circumferential side of the tubular portion 51 and either one of left and right side surfaces 54 of the case 15 is abutted against the abutment portion 52, either one of left and right side surfaces 55 of the case 15 is attached to a predetermined portion of the tubular portion 51 by means of, for example, welding and fixing.

Namely, in the attachment member 50, the abutment portion 52 is provided on either one of left and right sides of the tubular portion 51, and the other side of the tubular portion 51 is formed into the opening 56 for fitting in which a portion of or whole the case 15 in the shaft center direction is fitted. The case 15 is fitted in the attachment member 50 through the opening 56 for fitting to provide a fixing portion 57 in which the peripheral edge of the opening 56 for fitting and the peripheral edge of the case 15 are fixed by arbitrary means, and the case 15 is attached to the attachment member 50 by the fixing portion 57 of the inner circumference of the tubular portion 51, the abutment portion 52, and the case 15.

Accordingly, the tubular portion 51 may match the outer circumferential shape of the case 15, and since the attachment member 50 and the case 15 may be fixed in such a state that the case 15 is simply fitted in the attachment member 50, the assembly is extremely easy.

In other words, the other side surface 55 of the case 15 is fixed to an end edge of the tubular portion 51 in such a state that the one side surface 54 of the case 15 is abutted against the abutment portion 52. Thus, the length of the attachment member 50 in the shaft center direction and the length of the case 15 in the shaft center direction coincide with each other.

Namely, in such a state that the one side surface 54 of the case 15 is abutted against the abutment portion 52, the position of the end edge of the tubular portion 51 on the opposite side of the abutment portion 52 and the position of the other side surface 55 of the case 15 coincide with each other in the shaft center direction.

Since the shape of the inner circumferential surface of the attachment member 50 and the outer circumferential shape of the case 15 may be matched, the manufacturing is easy, and manufacturing accuracy and assembly accuracy are enhanced, whereby the operating accuracy of the recliner mechanism 4 is enhanced.

In the above case, an inclined surface or a step portion 58 having a stepped shape is formed between the tubular portion 51 and the abutment portion 52.

A longitudinal flange 60 is formed at the outer end of the tubular portion 51, the position of the flange 60 and the position of the other side surface 55 of the case 15 substantially coincide with each other in the shaft center direction, and the flange 60 and the other side surface 55 are fixed around the whole circumference or at a predetermined portion by welding Y, for example.

In an example, the inner side surface of the one side case 20 of the case 15 is the one side surface 54, and the outer side surface of the other side case 25 of the case 15 is the other side surface 55 in such a state that the one side surface 54 is abutted against the abutment portion 52. The other side surface 55 is set to be on substantially the same plane as the flange 60 of the attachment member 50, and the side surface 55 and the flange 60 are fixed.

Although illustration is omitted, the tubular portion 51 on the opposite side of the abutment portion 52 has an engagement protrusion protruding toward the center of the opening 56, a cut-out portion to be fitted with the engagement portion is provided on the case 15 side, the case 15 is fitted in the attachment member 50 in such a state that the cut-out portion is suited to the engagement protrusion, the case 15 is rotated in such a state that the one side surface 54 of the case 15 is abutted against the abutment portion 52, and the engagement protrusion is abutted against the other side surface 55 of the case 15 and may be engaged and fixed.

The one side case 20 and the other side case 25 of the case 15 of the recliner mechanism 4 integrally fixed by the attachment member 50 are attached in a fixing state respectively to the backrest side bracket 10 and the seat side bracket 11 along with the attachment member 50.

Either one of the one side case 20 and the other side case 25 of the case 15 is fixed to the tubular portion 51 of the attachment member 50, and the other one of the one side case 20 and the other side case 25 is abutted against the abutment portion 52 to be freely rotated with respect to the attachment member 50.

The attachment member 50 and the one side case 20 or the other side case 25 fixed to the attachment member 50 are fixed to either one of the backrest side bracket 10 and the seat side bracket 11, and the one side case 20 or the other side case 25 which is not fixed to the attachment member 50 is fixed to the other one of the backrest side bracket 10 and the seat side bracket 11.

In the above case, since the one side case 20 or the other side case 25 abutted against the abutment portion 52 of the attachment member 50 is fixed to the backrest side bracket 10 or the seat side bracket 11 to which the attachment member 50 is not fixed, the one side case 20 or the other side case 25 is fixed to the backrest side bracket 10 or the seat side bracket 11 through a connecting window hole (a window hole for connection) 61 formed in the abutment portion 52.

Figure 7:
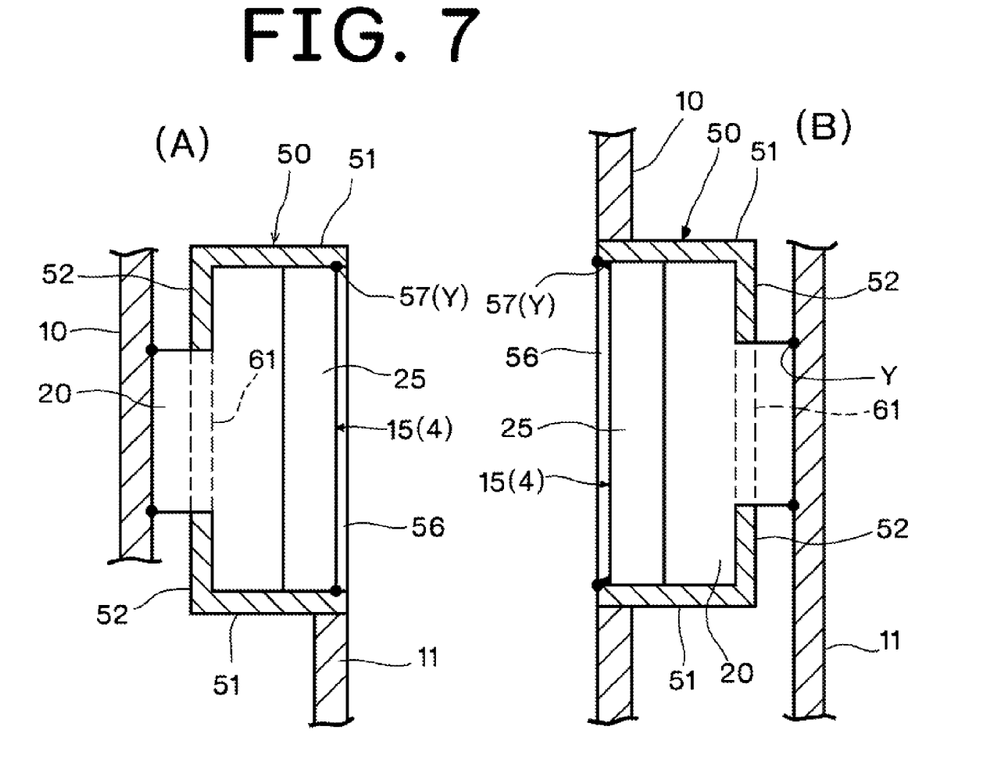
FIG. 7A is a schematic pattern diagram of an attachment example in which the attachment member is fixed to a seat side bracket.
FIG. 7B is a schematic pattern diagram of the attachment example in which the attachment member is fixed to the backrest side bracket.
Figure 8:
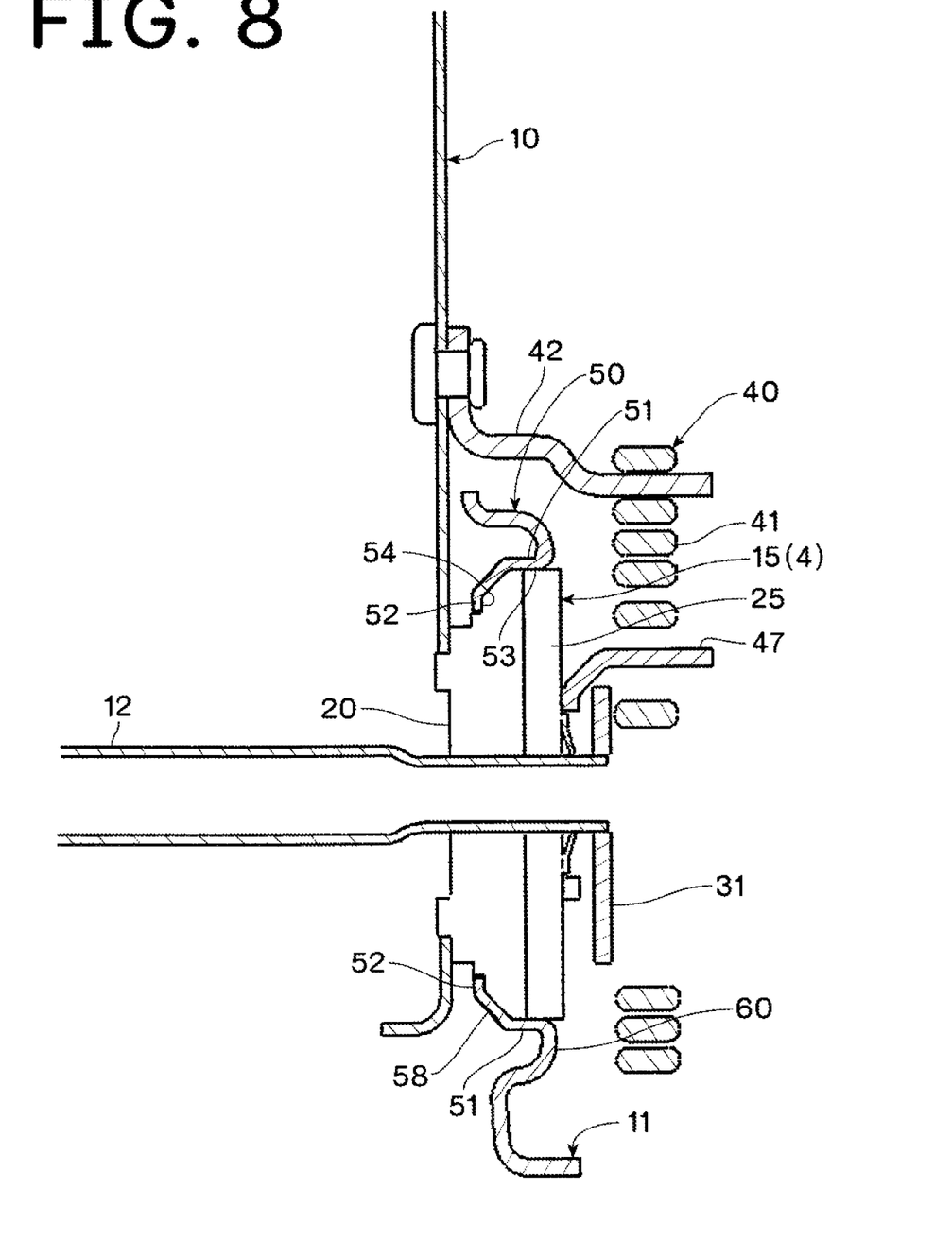
FIG. 8 is a cross-sectional view of the recliner mechanism.

Namely, as shown in FIG. 7, when the tubular portion 51 of the attachment member 50 is fixed to the seat side bracket 11 (FIG. 7A), the one side case 20 is fixed to the backrest side bracket 10 through the connecting window hole, and when the tubular portion 51 of the attachment member 50 is fixed to the backrest side bracket 10 (FIG. 7B), the one side case 20 is fixed to the seat side bracket 11 through the connecting window hole.

Although the attachment member 50 may be fixed to the backrest side bracket 10 or the seat side bracket 11, when the attachment member 50 is formed integrally with a portion of the backrest side bracket 10 or the seat side bracket 11, the number of components is reduced, and thus it is preferable.

Specifically, in the attachment member 50, the abutment portion 52 and the connecting window hole 61 are provided on either one of left and right sides of the tubular portion 51, an opening 56 for fitting is provided on the other one of left and right sides of the tubular portion 51, the attachment member 50 generally has a substantially recess shape having the connecting window hole 61 in its portion and having no bottom, and the case 15 is fitted in the attachment member 50.

The seat side bracket 11 is located outside the backrest side bracket 10. The seat side bracket 11 and the attachment member 50 are formed integrally with each other. The one side case 20 is abutted against the abutment portion 52 of the attachment member 50 so as to be freely rotated and is fixed to the backrest side bracket 10 through the connecting window hole 61, and the other side case 25 is fixed to the seat side bracket 11 through the tubular portion 51.

The backrest side bracket 10, the seat side bracket 11, and the one side case 20 and the other side case 25 of the case 15 may be assembled and fixed in any order. For example, the other side case 25 of the case 15 in which inner parts are previously assembled in the seat side bracket 11 is fixed, and then the one side case 20 may be fixed to the backrest side bracket 10. Alternatively, the one side case 20 is fixed to the seat side bracket 11 through the connecting window hole 61, the inner parts of the entire recliner mechanism 4 are then incorporated in the one side case 20, the one side case 20 is covered by the other side case 25, and the other side case 25 may be fixed to the attachment member 50. The assembling and fixing order may be other than these orders, and any order may be adopted.

Operation Of Embodiment

When the operating lever 31 for reclining is operated, the rotating central shaft 12 rotates the cam body 29, the cam body 29 is abutted against the cam surface 28 of the lock member 24, the lock member 24 slides in the slide groove 26 between the expanding portions 27, 27 in a direction in a direction separating from the engagement gear 22 to unlock the recliner mechanism 4, and, thus, to adjust the inclination angle of the backrest seat 3.

When the operating lever 31 for reclining is released, the cam body 29 is rotated in the lock direction by the spring 21, the lock member 24 slides in the slide groove 26, and the lock gear portion 23 of the lock member 24 is engaged with the engagement gear 22 to lock the recliner mechanism 4.

In the recliner mechanism 4, the one side case 20 and the other side case 25 of the case 15 are integrally fixed by the attachment member 50, and the case 15 and the attachment member 50 are attached to the backrest side bracket 10 and the seat side bracket 11; therefore, the number of components is small, the number of manufacturing and assembling processes can be reduced, and the manufacturing cost is reduced.

The attachment member 50 has at least the horizontal tubular portion 51 and the abutment portion 52 connecting to the peripheral edge of the tubular portion 51, and the inner circumferential surface of the tubular portion 51 is formed to face the outer circumferential surface 53 of the case 15; therefore, in such a state that the case 15 is located on the inner circumferential side of the tubular portion 51 and either one of left and right side surfaces 54 of the case 15 is abutted against the abutment portion 52, when either one of left and right side surfaces 55 of the case 15 is fixed to a predetermined portion of the tubular portion 51, the one side case 20 and the other side case 25 of the case 15 are integrally fixed by the attachment member 50.

Namely, in the attachment member 50, the abutment portion 52 is provided on either one of left and right sides of the tubular portion 51, the other one of left and right sides of the tubular portion 51 is formed in an opening 56 for fitting in which the case 15 can be fitted, and the length of the attachment member 50 in the shaft center direction and the length of the case 15 in the shaft center direction coincide with each other. Therefore, the case 15 is fitted in the attachment member 50 through the opening 56 for fitting, and when the one side surface 54 of the case 15 is abutted against the abutment portion 52, the position of the opening 56 for fitting and the position of the other side surface 55 of the case 15 coincide in the shaft center direction, and the attachment member 50 and the case 15 are easily fixed. Consequently, the one side case 20 and the other side case 25 of the case 15 are integrally fixed by the inner circumference of the tubular portion 51, the abutment portion 52, and the fixing portion 57.

Accordingly, since the attachment member 50 and the case 15 may be fixed in such a state that the case 15 is simply fitted in the attachment member 50, the assembly is extremely easy.

Since the shape of the inner circumferential surface of the attachment member 50 and the outer circumferential shape of the case 15 may be matched, the manufacturing is easy, and the manufacturing accuracy and the assembly accuracy are enhanced, whereby the operating accuracy of the recliner mechanism 4 is enhanced.

The longitudinal flange 60 is formed at the outer end of the tubular portion 51, and the position of the flange 60 and the position of the other side surface 55 of the case 15 substantially coincide with each other in the shaft center direction; therefore, the flange 60 and the side surface 55 are extremely easily fixed around the whole circumference or at a predetermined portion by welding Y.

In this example, the inner side surface of the one side case 20 of the case 15 is the side surface 54, and the outer side surface of the other side case 25 of the case 15 is the other side surface 55 in such a state that the one side surface 54 is abutted against the abutment portion 52. Since the side surface 55 is set to be on substantially the same plane as the flange 60 of the attachment member 50, the flange 60 and the other side surface 55 are extremely easily fixed by welding Y.

Either one of the one side case 20 and the other side case 25 of the case 15 is fixed to the tubular portion 51 of the attachment member 50, and the other one of the one side case 20 and the other side case 25 is abutted against the abutment portion 52 to be freely rotated with respect to the attachment member 50. Therefore, the attachment member 50 and the one side case 20 or the other side case 25 fixed to the attachment member 50 are fixed to either one of the backrest side bracket 10 and the seat side bracket 11. The one side case 20 or the other side case 25 which is not fixed to the attachment member 50 is fixed to the other one of the backrest side bracket 10 and the seat side bracket 11.

In the above case, since the one side case 20 or the other side case 25 abutted against the abutment portion 52 of the attachment member 50 is fixed to the backrest side bracket 10 or the seat side bracket 11 to which the attachment member 50 is not fixed, the one side case 20 or the other side case 25 is fixed to the backrest side bracket 10 or the seat side bracket 11 through the connecting window hole (the window hole for connection) 61 formed in the abutment portion 52.

Thus, even the one side case 20 or the other side case 25 held between the abutment portion 52 and the fixing portion 57 fixed to the tubular portion 51 can be fixed to the backrest side bracket 10 or the seat side bracket 11.

Since the attachment member 50 is formed integrally with a portion of the backrest side bracket 10 or the seat side bracket 11, the number of components can be reduced.

Specifically, in the attachment member 50, the abutment portion 52 and the connecting window hole 61 are provided on either one of left and right sides of the tubular portion 51, the opening 56 for fitting is provided on the other one of left and right sides of the tubular portion 51, and the attachment member 50 generally has a substantially recess shape having the connecting window hole 61 in its portion and having no bottom. Therefore, the one side case 20 is abutted against the abutment portion 52 of the attachment member 50 so as to be freely rotated and is fixed to the backrest side bracket 10 through the connecting window hole 61, and the other side case 25 is fixed to the seat side bracket 11 through the tubular portion 51.

The seat side bracket 11 and the attachment member 50 are integrally formed, and the seat side bracket 11 is located outside the backrest side bracket 10; therefore, the one side case 20 is abutted against the abutment portion 52 of the attachment member 50 so as to be freely rotated and is fixed to the backrest side bracket 10 through the connecting window hole 61, and the other side case 25 is fixed to the seat side bracket 11 through the tubular portion 51, whereby the attachment is facilitated.

REFERENCE SIGNS LIST

1 Seat for vehicle
2 Seat
3 Backrest seat
4 Recliner mechanism
5 Slide rail
10 Backrest side bracket
11 Seat side bracket
12 Rotating central shaft
13 Through hole
14 Through hole
20 One side case
22 Engagement gear
23 Lock gear portion
24 Lock member
25 Other side case
26 Slide groove
27 Expanding portion
28 Cam surface
29 Cam body
31 Operating lever for reclining
32 Wire
33 Retention portion
40 Spring
50 Attachment member
51 Tubular portion
52 Abutment portion
53 Outer circumferential surface
54 One side surface
55 Other side surface
56 Opening for fitting
57 Fixing portion
60 Flange
61 Window hole

The invention claimed is:

1. A seat for a vehicle, comprising:
a recliner mechanism;
a backrest seat that is attached to the seat through the recliner mechanism so that the backrest seat is freely rotated about a rotating central shaft and an inclination angle is freely adjusted;
wherein the recliner mechanism comprises:
a case comprising one side case and an other side case;
an engagement gear provided on an inner circumferential surface of either one of the one side case and the other side case;
a slide groove for guiding movement of a slide lock member in which a lock gear portion engaged with and released from the engagement gear provided on the other one of the one side case and the other side case;
an attachment member that integrally attaches the case so that the one side case and the other side case are freely rotatable;
wherein the attachment member comprises:
a horizontal tubular portion having a predetermined length;
an abutment portion connected to a peripheral edge of the tubular portion; and
a flange extending outward provided at an outer end of the tubular portion, and
wherein:
the abutment portion is provided on either one of left and right sides of the tubular portion, and the other one of left and right sides of the tubular portion is formed in an opening for fitting in which the case is fitted;
a position of the flange and a position of an outer side surface of the case substantially coincide with each other in a shaft center direction; and
further comprising a fixing portion formed by welding for fixing the outer side surface of the case to the flange around a whole circumference or at a predetermined portion of the outer side surface.

2. The seat for a vehicle according to claim 1, wherein:
an inclined surface or a step portion is provided between the tubular portion and the abutment portion, and
the outer circumferential surface of the case is abutted against and engaged with the inclined surface or the step portion.

3. The seat for a vehicle according to claim 1, further comprising a fixing portion in which a peripheral edge of the tubular portion on the side of the opening for fitting and a predetermined portion of the case which is not abutted against the abutment portion are fixed.

4. The seat for a vehicle according to claim 1, wherein:
either one of the one side case and the other side case of the case is fixed to the tubular portion of the attachment member, the other one of the one side case and the other side case is abutted against the abutment portion to be freely rotated with respect to the attachment member, the attachment member and the one side case or the other side case fixed to the attachment member are fixed to either one of a backrest side bracket of the backrest seat and a seat side bracket of the seat, and the one side case or the other side case which is not fixed to the attachment member is fixed to the other one of the backrest side bracket and the seat side bracket.

5. The seat for a vehicle according to claim 1, wherein the attachment member is provided integrally with a portion of a backrest side bracket of the backrest seat or a seat side bracket of the seat.

6. The seat for a vehicle according to claim 1, wherein:
either one of the one side case and the other side case of the case is fixed to the tubular portion of the attachment member, the other one of the one side case and the other side case is abutted against the abutment portion to be freely rotated with respect to the attachment member, the attachment member and the one side case or the other side case fixed to the attachment member are fixed to a seat side bracket of the seat, the seat side bracket is located outside a backrest side bracket of the backrest seat, and the one side case or the other side case which is not fixed to the attachment member is fixed to the backrest side bracket through a connecting window hole formed inside the abutment portion.

7. The seat for a vehicle according to claim 1, wherein the flange and the outer side surface of the case are disposed on substantially a same plane.

8. The seat for a vehicle according to claim 1, wherein:
either one of the one side case and the other side case is fixed to the tubular portion; and the other one of the one side case and the other side case is fitted with the abutment portion that contacts the abutment portion in both right-to-left and up-to-down directions.

* * * * *